(12) United States Patent
Hong

(10) Patent No.: US 9,451,596 B2
(45) Date of Patent: Sep. 20, 2016

(54) METHOD AND APPARATUS FOR TRANSMITTING AND RECEIVING UPLINK CONTROL INFORMATION IN CARRIER AGGREGATION ENVIRONMENT

(75) Inventor: Sungkwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 396 days.

(21) Appl. No.: 13/806,488

(22) PCT Filed: Jun. 21, 2011

(86) PCT No.: PCT/KR2011/004515
§ 371 (c)(1),
(2), (4) Date: Dec. 21, 2012

(87) PCT Pub. No.: WO2011/162531
PCT Pub. Date: Dec. 29, 2011

(65) Prior Publication Data
US 2013/0100918 A1  Apr. 25, 2013

(30) Foreign Application Priority Data

Jun. 21, 2010 (KR) ........................ 10-2010-0058806

(51) Int. Cl.
*H04W 4/00* (2009.01)
*H04W 72/04* (2009.01)
*H04L 5/00* (2006.01)

(52) U.S. Cl.
CPC .......... *H04W 72/0413* (2013.01); *H04L 5/001* (2013.01); *H04L 5/0055* (2013.01); *H04L 5/0023* (2013.01); *H04L 5/0064* (2013.01)

(58) Field of Classification Search
CPC ......... H04W 72/0413; H04W 76/048; H04W 74/002; H04W 74/006
See application file for complete search history.

(56) References Cited

U.S. PATENT DOCUMENTS

| 2010/0034156 A1 | 2/2010 | Malladi | |
|---|---|---|---|
| 2010/0272048 A1* | 10/2010 | Pan | H04L 1/1635 370/329 |
| 2012/0182914 A1* | 7/2012 | Hariharan | H04L 1/1614 370/311 |

FOREIGN PATENT DOCUMENTS

| JP | 2010-508783 | 3/2010 | |
|---|---|---|---|
| KR | WO2010018978 A2 * | 2/2010 | ........... H04B 7/0671 |

OTHER PUBLICATIONS

International Search Report dated Feb. 28, 2012 issued for PCT/KR2011/004515.

(Continued)

*Primary Examiner* — Amy Ng
*Assistant Examiner* — Parmanand Patel
(74) *Attorney, Agent, or Firm* — H.C. Park & Associates, PLC

(57) ABSTRACT

A method for transmitting uplink control information in a carrier aggregation environment, the method includes: calculating n pieces of response data, each having 1 bit or 2 bits, for n subframes received from an enhanced Node B (eNB) through n downlink component carriers and decoded by a User Equipment (UE); calculating k bits of integrated response data by applying a mapping rule reflecting a weight given to a downlink component carrier of each of the n pieces of response data; and performing a block coding of the integrated response data to produce encoded integrated response data, and transmitting the encoded integrated response data to the eNB.

4 Claims, 16 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (release 9)," 3GPP TS 36.213 V9.1.0, Mar. 2010. (URL: http://www.3gpp.org/ftp/Specs/html-info/36213.htm).

3GPP, "3rd Generation Partnership Project; Technical Specification Group Radio Access Network; Further advancements for E-UTRA; LTE-Advanced feasibiligy studies in RAN WG4 (Release 9)," 3GPP TR 36.815 V9.0.0, Mar. 2010 (URL: http://3gpp.org/ftp/Specs/html-info/36815.htm).

Written Opinion dated Feb. 28, 2012 issued for PCT/KR2011/004515.

* cited by examiner

Fig. 2

| PUCCH Format | Uplink Control Information (UCI) |
|---|---|
| Format 1 | Scheduling Request (SR) |
| Format 1a | 1-bit HARQ ACK/NACK (including or not including SR) |
| Format 1b | 2-bit HARQ ACK/NACK (including or not including SR) |
| Format 2 | CQI (20 coded bits) |
| Format 2 | CQI and 1- or 2-bit HARQ ACK/NACK (20 bits) in Extended CP |
| Format 2a | CQI and 1-bit HARQ ACK/NACK (20 + 1 coded bits) |
| Format 2b | CQI and 2-bit HARQ ACK/NACK (20 + 2 coded bits) |

Figure 5

| CCj | CC1 | CC2 | CC3 | CC4 |
|---|---|---|---|---|
| Number of Pieces of Response Data ($F_j$) | 3 | 5 | 2 | 4 |
| Response Data ($G_j$) | 1 (ACK) | 2 (ACK/NACK) | 1 (ACK) | 3 (ACK/ACK) |

500

510

$$\text{Integrated Response Data} = G_1 + G_2 \cdot \left(\prod_{l=1}^{1} F_l\right) + G_3 \cdot \left(\prod_{l=1}^{2} F_l\right) + G_4 \cdot \left(\prod_{l=1}^{3} F_l\right)$$

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 0 | 0 | 0 | 0 | 0 | 0 | 0 | 1 | 1 | 1 | 0 |
| 2 | 1 | 0 | 1 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 0 | 1 | 0 | 1 | 1 | 0 | 0 | 1 | 1 | 1 |
| 5 | 1 | 0 | 0 | 0 | 1 | 0 | 1 | 1 | 1 | 0 | 1 | 1 | 1 |
| 6 | 1 | 0 | 1 | 1 | 1 | 0 | 0 | 0 | 1 | 1 | 1 | 1 | 1 |
| 7 | 1 | 0 | 0 | 1 | 1 | 0 | 0 | 1 | 0 | 0 | 1 | 1 | 1 |
| 8 | 1 | 1 | 1 | 0 | 0 | 1 | 1 | 0 | 0 | 1 | 1 | 1 | 1 |
| 9 | 1 | 0 | 1 | 0 | 0 | 1 | 1 | 0 | 1 | 1 | 1 | 1 | 1 |
| 10 | 1 | 0 | 0 | 1 | 0 | 1 | 0 | 1 | 1 | 0 | 1 | 1 | 1 |
| 11 | 1 | 1 | 0 | 0 | 0 | 1 | 0 | 1 | 0 | 1 | 1 | 0 | 1 |
| 12 | 1 | 0 | 0 | 0 | 1 | 1 | 0 | 1 | 0 | 0 | 1 | 0 | 1 |
| 13 | 1 | 1 | 0 | 0 | 1 | 1 | 0 | 1 | 0 | 0 | 1 | 1 | 1 |
| 14 | 1 | 1 | 0 | 0 | 1 | 1 | 1 | 0 | 0 | 1 | 1 | 1 | 1 |
| 15 | 1 | 0 | 1 | 1 | 1 | 1 | 0 | 1 | 1 | 0 | 1 | 0 | 1 |
| 16 | 1 | 1 | 0 | 1 | 1 | 1 | 1 | 0 | 0 | 0 | 0 | 0 | 1 |
| 17 | 1 | 0 | 0 | 1 | 0 | 1 | 1 | 0 | 0 | 0 | 0 | 1 | 0 |
| 18 | 1 | 1 | 0 | 1 | 0 | 1 | 0 | 0 | 0 | 0 | 0 | 0 | 0 |
| 19 | 1 | 0 | 0 | 0 | 0 | 1 | 1 | 0 | 0 | 0 | 0 | 0 | 0 |

Fig. 9

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

METHOD AND APPARATUS FOR TRANSMITTING AND RECEIVING UPLINK CONTROL INFORMATION IN CARRIER AGGREGATION ENVIRONMENT

CROSS-REFERENCE TO RELATED APPLICATIONS

This application is the National Stage Entry of International Application No. PCT/KR2011/004515, filed on Jun. 21, 2011 and claims priority from and the benefit of Korean Patent Application No. 10-2010-0058806, filed on Jun. 21, 2010, both of which are hereby incorporated by reference for all purposes as if fully set forth herein

BACKGROUND

1. Field

Embodiments of the present invention relate to a wireless communication system, and more particularly, to a method and an apparatus for transmitting and receiving uplink control information in a carrier aggregation environment.

2. Discussion

With the development of communication systems, a wide variety of wireless terminals are being used by consumers, such as business companies and individuals.

Current mobile communication systems, such as 3GPP (3rd Generation Partnership Project), LTE (Long Term Evolution), and LTE-A (LTE Advanced), are requiring the development of technology for a high-speed large-capacity communication system, which can transmit or receive various data, such as images and wireless data, beyond the capability of mainly providing a voice service, and can transmit data of such a large capacity as that transmitted in a wired communication network. Moreover, the current mobile communication systems are inevitably requiring a proper error detection scheme, which can minimize the reduction of information loss and improve the system transmission efficiency, thereby improving the system performance.

Further, various technologies are provided in order to determine if exact information has been transmitted or received. The development of communication systems has required a technology capable of identifying transmitted or received information in a more flexible and expandable manner. Especially, the use of multiple antennas or multiple subcarriers has increased the quantity of transmitted or received data, thereby increasing the quantity of data required in order to check errors in the transmitted or received data and transmit the result of the checking.

SUMMARY

Additional features of the invention will be set forth in the description which follows, and in part will be apparent from the description, or may be learned by practice of the invention.

An exemplary embodiment of the present invention discloses a method of transmitting uplink control information in a carrier aggregation environment, the method including the steps of: calculating n pieces of response data, each having 1 bit or 2 bits, for n PDSCH (Physical Downlink Shared Channel)s in one subframe received from an enhanced Node B (eNB) through n downlink component carriers and decoded by a User Equipment (UE); calculating k bits of integrated response data by applying a mapping rule reflecting a weight given to a downlink component carrier of each of the n pieces of response data; and performing a block coding of the integrated response data to produce encoded integrated response data, and transmitting the encoded integrated response data to the eNB.

Another exemplary embodiment of the present invention discloses a method of receiving uplink control information in a carrier aggregation environment, the method including the steps of: receiving encoded integrated response data from a UE by an eNB; calculating k bits of integrated response data by performing a block decoding of the received encoded integrated response data; calculating n pieces of response data, each having a size of 1 bit or 2 bits, for each of the downlink component carriers by applying a de-mapping rule reflecting weights given to n downlink component carriers to the calculated integrated response data; and determining whether to perform an additional process in relation to a subframe of transmitted the PDSCH (Physical Downlink Shared Channel)s through the downlink component carrier by using the n pieces of response data.

Another exemplary embodiment of the present invention discloses an apparatus for transmitting uplink control information in a carrier aggregation environment, the apparatus including: a receiver for receiving n PDSCH (Physical Downlink Shared Channel)s in one subframe from an eNB through downlink component carriers by a UE; a decoder for decoding the received n PDSCHs; a verification unit for calculating n pieces of response data, each having 1 bit or 2 bits, for the decoded PDSCHs; a control information generator for calculating k bits of integrated response data by applying a mapping rule reflecting a weight given to a downlink component carrier of each of the n pieces of response data; and an encoder for performing a block coding of the integrated response data; and a transmitter for transmitting encoded integrated response data, having been encoded by the encoder, to the eNB.

Another exemplary embodiment of the present invention discloses an apparatus for receiving uplink control information in a carrier aggregation environment, the apparatus including: a transmitter for transmitting PDSCH (Physical Downlink Shared Channel)s in one subframe to a UE through n downlink component carriers; a receiver for receiving encoded integrated response data for the transmitted PDSCHs from the UE; a decoder for calculating k bits of integrated response data by performing a block decoding of the received encoded integrated response data; and a verification unit for calculating n pieces of response data, each having a size of 1 bit or 2 bits, for each of the downlink component carriers by applying a de-mapping rule reflecting weights given to n downlink component carriers to the calculated integrated response data, and determining whether to perform an additional process in relation to a subframe of transmitted the PDSCHs through the downlink component carrier by using the n pieces of response data.

Another exemplary embodiment of the present invention discloses a method of transmitting uplink control information in a carrier aggregation environment, the method including the steps of: calculating n pieces of response data, each having 1 bit or 2 bits, for one or two codewords of each of n PDSCH (Physical Downlink Shared Channel)s in one subframe received from an eNB through n downlink component carriers and decoded by a UE; calculating k bits of integrated response data by combining the n pieces of response data in serial according to a sequence preset for downlink component carriers; and performing a block coding of the integrated response data to produce encoded integrated response data, and transmitting the encoded integrated response data to the eNB.

Another exemplary embodiment of the present invention discloses a method of receiving uplink control information in a carrier aggregation environment, the method including the steps of: receiving encoded integrated response data from a UE by an eNB; calculating k bits of integrated response data by performing a block decoding of the received encoded integrated response data; extracting n pieces of response data, each having a size of 1 bit or 2 bits, for one codeword or two codewords of each subframe previously transmitted through n downlink component carriers from the calculated k bits of integrated response data according to a sequence preset for the n downlink component carriers; and determining whether to retransmit the subframe by using the n pieces of response data.

Another exemplary embodiment of the present invention discloses an apparatus for transmitting uplink control information in a carrier aggregation environment, the apparatus including: a receiver for receiving n PDSCH (Physical Downlink Shared Channel)s in one subframe from an eNB through n downlink component carriers by a UE; a decoder for decoding the received n PDSCHs; a verification unit for calculating n pieces of response data, each having 1 bit or 2 bits, for one or two codewords of each of the decoded n PDSCHs; a control information generator for calculating k bits of integrated response data by combining the n pieces of response data in serial according to a sequence preset for downlink component carriers; an encoder for performing a block coding of the integrated response data; and a transmitter for transmitting encoded integrated response data, having been encoded by the encoder, to the eNB.

Another exemplary embodiment of the present invention discloses an apparatus for receiving uplink control information in a carrier aggregation environment, the apparatus including: a transmitter for transmitting PDSCH (Physical Downlink Shared Channel)s in one subframe to a UE through n downlink component carriers; a receiver for receiving encoded integrated response data for the transmitted PDSCHs from the UE; a decoder for calculating k bits of integrated response data by performing a block decoding of the received encoded integrated response data; and a verification unit for extracting n pieces of response data, each having a size of 1 bit or 2 bits, for one codeword or two codewords of each PDSCH previously transmitted through n downlink component carriers from the calculated k bits of integrated response data according to a sequence preset for the n downlink component carriers, and determining whether to retransmit the subframe by using the n pieces of response data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 illustrates formats of an uplink control channel according to an embodiment of the present invention.

FIG. 5 illustrates a process of generating integrated response data by applying a mapping rule in the case of generating various types of response data according to an embodiment of the present invention.

FIG. 8 is a Reed-Muller (20, A) code configuration table according an embodiment of the present invention.

FIG. 9 is a Reed-Muller (32, O) code configuration table according an embodiment of the present invention.

DETAILED DESCRIPTION OF THE ILLUSTRATED EMBODIMENTS

Figure 1:
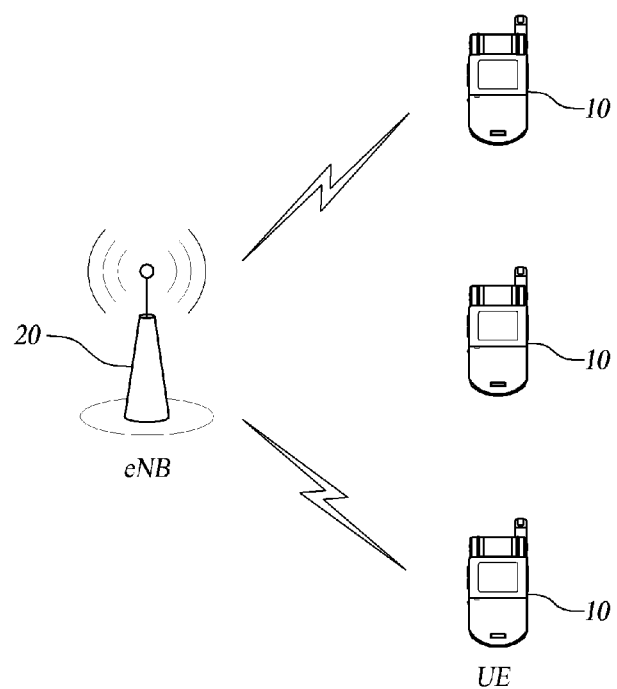
FIG. 1 illustrates a wireless communication system, to which embodiments of the present invention are applied.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

The present disclosure provides a method and an apparatus for transmitting and receiving uplink control information in a carrier aggregation environment.

Also, the present disclosure provides a method and an apparatus capable of transmitting and receiving uplink control information having a length changeable according to the carrier aggregation environment.

FIG. 1 illustrates a wireless communication system, to which embodiments of the present invention are applied.

Wireless communication systems are widely arranged in order to provide various communication services, such as voice, packet data, etc.

Referring to FIG. 1, a wireless communication system includes a UE (User Equipment) 10 and an enhanced Node B (eNB) 20. The UE 10 and the eNB 20 employ an HARQ ACK/NACK feedback technology, which will be described in more detail below with reference to FIG. 3.

As used herein, the UE 10 has an inclusive meaning referring to a user terminal in a wireless communication, and should be construed as a concept including not only a UE in WCDMA, LTE, HSPA (High Speed Packet Access), etc. but also MS (Mobile Station), UT (User Terminal), SS (Subscriber Station), and wireless device and an MS (Mobile Station) in GSM (Global System for Mobile Communication). In the following description, the terms "terminal", "user terminal", and "UE" are used as having the same meaning, and the terms "base station" and "eNB" are used as having the same meaning.

In the present specification, the UE 10 and the eNB 20 are not limited to specifically expressed terms or words and inclusively indicate two transmitting and receiving agents used for implementation of the technology or technical idea described herein.

There is no limit in the multiple access schemes applicable to a wireless communication system. That is, various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA, can be applied to the wireless communication system.

For the uplink transmission and the downlink transmission, it is possible to use either a TDD (Time Division Duplex) scheme using different times for transmission or an FDD (Frequency Division Duplex) scheme using different frequencies for transmission.

Embodiments of the present invention can be applied to resource allocation in the asynchronous wireless communication, which is evolving to the LTE (Long Term Evolution) and the LTE-A (LTE-advanced) through the GSM, the WCDMA, and the HSPA, and resource allocation in the synchronous wireless communication, which is evolving to the CDMA, the CDMA-2000, and the UMB. The present invention shall not be restrictively construed based on a particular wireless communication field and shall be construed to include all technical fields to which the concept of the present invention can be applied.

The wireless communication system, to which embodiments of the present invention are applied, can support uplink and/or downlink HARQ, and may use a Channel Quality Indicator (CQI) for link adaptation. Further, different schemes may be used for the downlink transmission and uplink transmission. For example, an OFDMA (Orthogonal Frequency Division Multiple Access) scheme may be used for the downlink while an SC-FDMA (Single Carrier-Frequency Division Multiple Access) scheme is used for the uplink.

Radio interface protocol layers between a UE and a network may be classified into a first layer (L1), a second layer (L2), and a third layer (L3) based on the lower three layers of the Open System Interconnection (OSI) model widely known in the communication system, and a physical layer belonging to the first layer provides an information transfer service using a physical channel.

FIG. 2 illustrates formats of an uplink control channel according to an embodiment of the present invention.

An uplink communication for data transmission from a UE to an eNB uses a Physical Uplink Control Channel (PUCCH). Information transmitted through the PUCCH may include response information (including Acknowledge/NoAcknowledge (ACK/NACK or ACK/NAK) information) for HARQ with respect to a downlink packet, Channel Quality Indicator (CQI) information, and Multiple Input Multiple Output (MIMO) feedback information for downlink transmission, such as Rank Indicator (RI) and Precoding Matrix Indicator (PMI). In order to transmit such information, the PUCCH of the LTE uses control information formats as shown in FIG. 2.

Meanwhile, the 3GPP LTE-A uses a Carrier Aggregation (CA) including a plurality of uplink and downlink Component Carriers aggregated together. In this event, in order to process HARQ for data transmitted by a plurality of Downlink Component Carriers (DLCCs), it is necessary to transmit an ACK/NACK in the uplink. That is, it is necessary to efficiently transmit response information with respect to a plurality of downlink component carriers. Of course, it is also necessary to take the compatibility with the existing system using a single component carrier into consideration.

In other words, in a CA environment, the number of ACK/NACKs to be transmitted in the uplink by a UE increases in proportion to the number of downlink CCs used by the UE. In the case of transmitting an HARQ result in the form of ACK/NACK according to format 1a or format 1b as shown in FIG. 2, it is difficult to reflect the number of increasing carriers. Therefore, an extended format is necessary. As shown in FIG. 2, format 2 refers to a format for transmitting CQI information, and format 2 corresponds to a transmission scheme capable of transmitting information of 4~13 bits and is mainly used for transmission of CQI information. Format 2 is sometimes used for transmission of ACK/NACK information in addition to the CQI information in the case of the extended CP. However, this use is limitedly employed.

Hereinafter, a scheme of providing HARQ information for a plurality of downlink carriers by using the quantity of information of format 2 or format 3, which is longer than 1 bit or 2 bits, according to an embodiment of the present invention will be described. The HARQ information may be an example of uplink control information including response information for the data transmitted by downlink carriers in the HARQ process. In this event, it is possible to apply an extended format of format 1a or 1b supporting only one bit or two bits. In the present disclosure, the downlink refers to a physical channel for data transmitted from an eNB to a UE while the uplink refers to a physical channel for data transmitted from a UE to an eNB.

Further, in the present disclosure, when there are a plurality of downlink component carriers and uplink component carriers, the downlink component carriers and uplink component carriers may include at least one downlink component carrier for transmission and reception of important control information and at least one uplink component carrier for transmission and reception of important control information, which are called Primary Downlink CC and Primary Uplink CC, respectively. The Primary Downlink CC and Primary Uplink CC configure a Primary Cell (PCell). The response data includes information on a result of inspection of received data, reporting whether the received data has been transmitted without error or not. The response data can verify the transmitted data through one CC. Further, it is possible to generate a single piece of response data by combining two or more pieces of response data. In this event, the combined single piece of response data is called bundling response data. Further, response data for all of received downlink CCs is called integrated response data.

In the case of the LTE or LTE-A system, when a control information channel, i.e. a Physical Downlink Control Channel (PDCCH), exists in a packet received and decoded by a UE, the UE can determine if occurrence of an error has been detected as a result of decoding of a Physical Downlink Shared Channel (PDSCH) by using the PDCCH, and then transmit an ACK or NACK as a response data. Further, when the received packet does not contain control information, such as PDCCH, discontinuous transmission (DTX) information may be used as response data. Further, the response data may include control information, such as Scheduling Request (SR), for identifying the network situation information and requesting for a predetermined process for an eNB.

Figure 3:
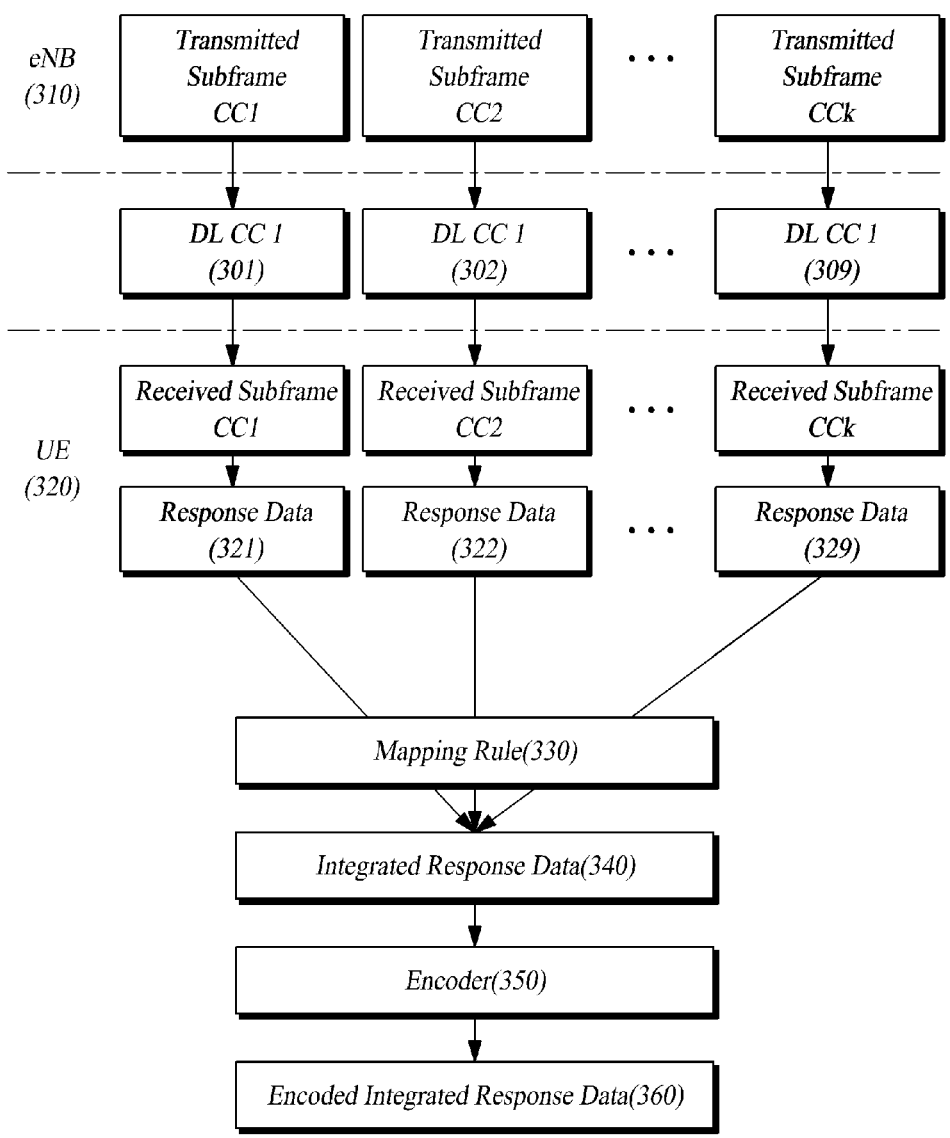
FIG. 3 is a block diagram illustrating a process of obtaining response data with respect to data received through a plurality of downlink CCs and converting the response data to provide converted data in an uplink by a UE according to an embodiment of the present invention.

FIG. 3 is a block diagram illustrating a process of obtaining response data with respect to data received through a plurality of downlink CCs and converting the response data to provide converted data in an uplink by a UE according to an embodiment of the present invention.

In FIG. 3, embodiment of the present invention, the plurality of downlink CC can share same subframe period, so, the transmitted subframe of each CC can be identical. Also, the received subframe of each CC can be identical. A subframe refers to a transmission unit for transmitting a physical signal including control information and data information, and can be also called frame, block, etc. One or more PDSCHs can be transmitted in a subframe. In one subframe, one or more PDSCHs can be transmitted, and the response data can be related to one or more PDSCH of one subframe. The eNB 310 transmits one or more PDSCHs in subframe through k downlink component carriers 301, 302, . . . , 309. A transmitted one or more PDSCHs in subframe may include a control channel (control information) and a data channel (data information). A UE 320 receives one or more PDSCHs in subframe through downlink component carriers 301, 302, . . . , 309 from the eNB 310. Then, the UE 320 determines if the received one or more PDSCHs in subframe have been transmitted without error, and generates response data 321, 322, . . . , 329. In the case of the LTE or LTE-A system, non-error transmission or transmission without error corresponds to a case where no error has been detected as a result of decoding of a PDSCH using a PDCCH existing in a subframe received and decoded by a UE. The UE 320 determines if an error has occurred or not, and may transmit an ACK or NACK as a response data. Further, when the subframe does not contain control information (for example, when the subframe does not contain PDCCH), discontinuous transmission (DTX) information may be used as response data. Further, the response data may include control information, such as Scheduling Request (SR), for identifying the network situation information and requesting for a predetermined process for an eNB.

Whether an error has occurred in the received data may determined with reference to information, such as Cyclic Redundancy Check (CRC). Further, a mapping rule 330 is applied in order to generate single integrated response data 340 from multiple pieces of generated response data. The mapping rule 330 converts the HARQ response data for each downlink component carrier to data that can be identified by the eNB 310. Examples of the mapping rule 330 may include a mapping rule based on the location of the downlink component carriers, a mapping rule applying weight information of the downlink component carriers, or a mapping rule applying a predetermined function. According to the mapping rule based on the location of the downlink component carriers, when each piece of response data corresponds to a binary number, bits expressing the binary numbers may be interconnected to generate integrated response data. When the integrated response data 340 has been generated, an encoding process is performed in order to enable transmission of this data through uplink component carriers from the UE 320 to the eNB 310. This encoding process is performed by an encoder 350. According to an example of the encoding process, the integrated response data 340, which corresponds to predetermined information bits, may be punctured or repeated by a block code encoder 350. The encoded integrated response data 340 generated by the encoder 350 can be transmitted through a single uplink component carrier, wherein the single uplink component carrier may be an example of the primary uplink component carriers.

Figure 4:
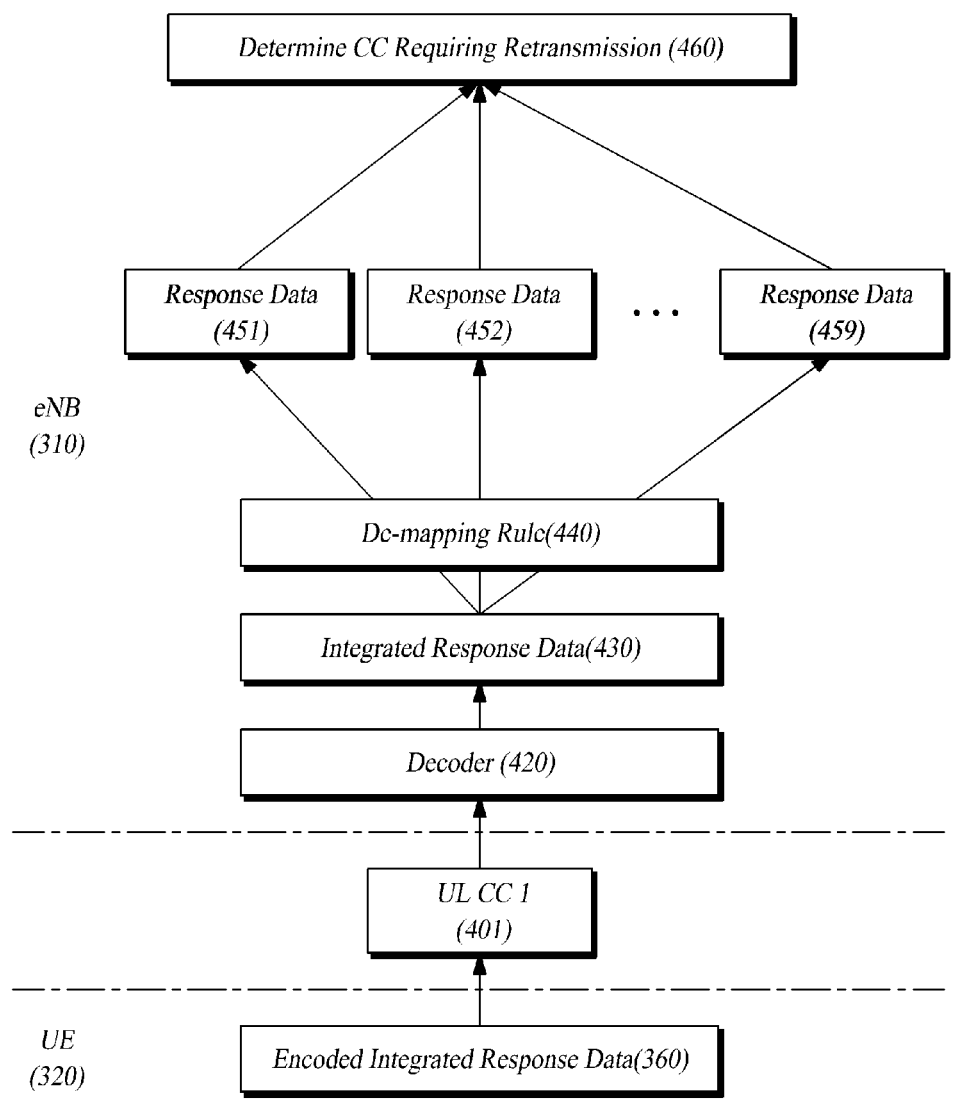
FIG. 4 is a block diagram illustrating a process of obtaining response data with respect to a plurality of downlink component carriers from the integrated response data received through a plurality of uplink CCs by an eNB according to an embodiment of the present invention.

FIG. 4 is a block diagram illustrating a process of obtaining response data with respect to a plurality of downlink component carriers from the integrated response data received through a plurality of uplink CCs by an eNB according to an embodiment of the present invention. The process shown in FIG. 4 is also progressed between the UE 320 and the eNB 310 shown in FIG. 3. The encoded integrated response data 360 in the process shown in FIG. 3 is transmitted to the eNB 310 through ULCC1 401, which is an uplink component carrier. Then, the eNB 310 decodes the encoded integrated response data 360 to integrated response data 430 by using a decoder 420. Then, the eNB 310 applies a de-mapping rule 440 to the decoded integrated response data 430, so as to obtain multiple pieces of response data 451, 452, . . . , 459 according to component carriers, respectively. Based on the obtained response data, the eNB 310 determines the component carrier, which requires retransmission, in the step indicated by 460. Based on a result of the determination, the eNB 310 performs the retransmission. In step 460 of FIG. 4, further to the determination on whether to perform the retransmission, the eNB 310 may perform an additional process for a scheduling request according to various embodiments of the response data. That is, when the response data includes control information, such as SR, the eNB 310 may perform an additional process corresponding to the control information. That is, the SR may also be included in the response data.

As noted from FIGS. 3 and 4, response data with respect to each component carrier may include various types of information. Hereinafter, response data configurable according to embodiments of the present invention will be discussed.

The transmission scheme applied to each component carrier is expressed by a transmission mode, and there are various kinds of transmission modes. However, in view of the quantity of required ACK/NACK bits, there are two kinds of transmission modes. That is, the two kinds of transmission modes include a transmission mode, which is achieved by one codeword and requires one ACK/NACK bit, and the other transmission mode, which employs transmission by using two codewords and requires two ACK/NACK bits (including one ACK/NACK bit per codeword).

Further, it is possible to express the very reception itself of the PDCCH. When there is a PDCCH, it is possible to decode a PDSCH by using the PDCCH, to express the ACK/NACK. However, in a situation in which a PDCCH has not been received, the UE may transmit DTX information to the eNB in order to report the situation.

In consideration of the variety of information which the response data may have, the response data may include ACK/NACK information and DTX information. As a result, the quantity of information that a UE should express for a PDSCH of one CC in consideration of the HARQ can be classified as follows.

In the case of one codeword, each of two types of information may be expressed by one bit. For example, either the ACK may have a value of 1 while the NACK may have a value of 0, or the ACK may have a value of 0 while the NACK may have a value of 1. These values may be different according to the implementation process, to which the present invention is not limited.

Two codewords may be expressed by four values (two bits). As an embodiment, the following configuration may be possible. The two codewords may be expressed by 0 (corresponding to a binary number of 00) when the first codeword is NACK and the second codeword is NACK, by 1 (corresponding to a binary number of 01) when the first codeword is NACK and the second codeword is ACK, by 2 (corresponding to a binary number of 10) when the first codeword is ACK and the second codeword is NACK, and by 3 (corresponding to a binary number of 11) when the first codeword is ACK and the second codeword is ACK. This configuration corresponds to a case in which the first bit corresponds to the first bit, the second bit corresponds to the second bit, and the ACK has a value of 1 while the NACK has a value of 0 for each codeword.

Meanwhile, when one codeword and the DTX information are transmitted with discrimination between them, they are expressed by three types of values. For example, the ACK may be expressed by 1, the NACK may be expressed by 0, and the DTX may be expressed by 2.

Further, when two codewords and the DTX information are transmitted with discrimination between them, they are expressed by five types of values. For example, the two codewords may be expressed by 0 when the first codeword is NACK and the second codeword is NACK, by 1 when the first codeword is NACK and the second codeword is ACK, by 2 when the first codeword is ACK and the second codeword is NACK, and by 3 when the first codeword is ACK and the second codeword is ACK. Further, the DTX may be expressed by 4.

Of course, the transmitted response data may include control information, such as SR. SR can be 1 bit, and SR can be concatenated with other response information like the ACK, NACK, DTX information. This may be applied after variously modified during the system implementation. The information for each value as described above may be differently set according to the system. For example, when the response data includes only ACK/NACK, 1 may be allocated to the ACK while 0 is allocated to the NACK, or the ACK may have a value of 0 while the NACK may have a value of 1. These values may be different according to the implementation process, to which the present invention is not limited.

The integrated response data shown in FIGS. 3 and 4 refers to a combination of multiple pieces of response data obtained from respective component carriers in a manner in which the multiple pieces of response data can be discriminated or identified according to the component carriers.

Hereinafter, a process of generating integrated response data by applying a mapping rule in the case of generating various types of response data according to an embodiment of the present invention will be described with reference to FIG. 5.

There are various types of response data, which the UE should transmit based on a determination on whether the data received by the UE has an error, according to the number of codewords of each component carrier and according to whether the DTX information is transmitted. As a presumption, the UE and the eNB share information about the codeword used for each transmitted component carrier, information on whether they exchange the DTX information, etc. Let us put the maximum value of information, which each component carrier may have, as $f^j$, wherein $F_j$ implies the number of cases for response data containing information on whether data received through a particular component carrier has an error and $F_j$ for component carrier j(CCj) may have a value among 2, 3, 4, and 5 according to the number of codewords and according to whether the DTX information is transmitted. Of course, this is based on an embodiment of the present invention and does not limit the scope of the present invention. Meanwhile, $G_j$ implies response data for a particular component carrier CCj for each subframe. Therefore, $G_j$ may have a value set according to whether the response data is ACK, NACK, or DTX.

In FIG. 5, Equation 1 defined below is applied as an example of the mapping rule.

$$\text{input} = \sum_{j=2}^{n}\left(G_j \cdot \left(\prod_{l=1}^{j-1} F_l\right)\right) + G_1 \quad \text{[Equation 1]}$$

Equation 1 corresponds to an example of the mapping rule, which generates integrated response data by applying a predetermined weight to each component carrier and using the types of values, which can be response data for each component carrier, and the response data. The weight corresponds to information for converting multiple pieces of response data into one piece of integrated response data, and is calculated by $$\prod_{l=1}^{j-1} F_l$$

using Fj in the case of Table 1 as an example. A value obtained by applying Equation 1 as a mapping rule corresponds to the integrated response data, a more detailed embodiment of which is shown in FIG. 5.

Table 1 below shows characteristics of values which each component carrier may have.

TABLE 1

|  | CC1 | CC2 | CC3 | CC4 |
|---|---|---|---|---|
| Codeword | One | Two | One | Two |
| Whether response data includes DTX | O | O | X | X |

TABLE 1-continued

| | CC1 | CC2 | CC3 | CC4 |
|---|---|---|---|---|
| Response Data | 0: NACK<br>1: ACK<br>2: DTX | 0: NACK/NACK<br>1: NACK/ACK<br>2: ACK/NACK<br>3: ACK/ACK<br>4: DTX | 0: NACK<br>1: ACK | 0: NACK/NACK<br>1: NACK/ACK<br>2: ACK/NACK<br>3: ACK/ACK |
| Number of pieces of response data (Fj) | 3 | 5 | 2 | 4 |
| Response data (Gj) | 1(ACK) | 2(ACK/NACK) | 1(ACK) | 3(ACK/ACK) |

Referring to FIG. 1, in the case of using one codeword (CC3), the response data may have a value of 1 for ACK and 0 for NACK. In the case of using two codewords (CC4), the response data may have a value of 0 when the first codeword is NACK and the second codeword is NACK, 1 when the first codeword is NACK and the second codeword is ACK, 2 when the first codeword is ACK and the second codeword is NACK, and 3 when the first codeword is ACK and the second codeword is ACK.

Further, when one codeword and DTX information are transmitted with discrimination between them, the response data may have a value of 1 for ACK, 0 for NACK, and 2 for the DTX.

Moreover, when two codewords and DTX information are transmitted with discrimination between them, the response data may have a value of 0 when the first codeword is NACK and the second codeword is NACK, 1 when the first codeword is NACK and the second codeword is ACK, 2 when the first codeword is ACK and the second codeword is NACK, and 3 when the first codeword is ACK and the second codeword is ACK. Further, the response data may have a value of 4 for the DTX.

Hereinafter, a process of applying Equation 1 as a mapping rule by using the number of pieces of response data as shown in Table 1 and the response data will be described with reference to FIG. 5.

The embodiment 500 in FIG. 5 is based on a case in which CC1 has the lowest weight and the weight becomes higher in the order of CC2, CC3, and CC4. According to the implementation scheme, the weights may be provided either in an inverse order or according to a predefined order. For example, for CC1, CC2, CC3, and CC4 used as downlink component carriers by a UE and an eNB, the higher weight may be given in an order of CC4, CC1, CC3, and CC2. This information may be provided through signaling from a higher layer. Otherwise, pre-promised information may be used in a process in which the eNB and the UE newly allocate or remove a component carrier. For example, the highest weight may be given to a most recently added component carrier.

Equation 1 may be changed into Equation 2 below through a modification according to the case of FIG. 5.

$$\text{INTEGRATED RESPONSE DATA} = \sum_{j=2}^{4}\left(G_j \cdot \left(\prod_{i=1}^{j-1} F_i\right)\right) + G_1 \quad \text{[Equation 2]}$$

By applying Fj and Gj of Table 1 to Equation 2, it is possible to obtain the process 510 spread out in FIG. 5. The weights are ascending in the order of CC1, CC2, CC3, and CC4. As shown in FIG. 5, the weights have the order of CC1, CC2, CC3, and CC4, G1, which is response data for CC1, is added without change to the integrated response data, and G2, which is response data for CC2, is multiplied by F1, which is also a weight. Also, G3, which is response data for CC3, is multiplied by weights F1 and F2, and G4, which is response data for CC4, is multiplied by weights F1, F2, and F3. The weights functions to discriminate between multiple pieces of response data included in one piece of integrated response data. For example, the weight may be expressed by the number of digits in the case of a decimal number, and may be expressed by a location of a corresponding bit in the case of a binary number. When the integrated response data is a binary number, expressing by the location of a corresponding bit implies that information of a particular bit expresses response data of a particular CC. This implies that the integrated response data is configured in such a manner that response data of a particular CC can be identified by the unit of a bit or bits having a particular length, such as 1 bit or 2 bits. The response data for each CC can be located in the integrated response data according to an order preset by the eNB and the UE. Further, the eNB and the UE can determine whether the length of response data of a particular CC is 1 bit or 2 bits. Since the magnitude of the value Fj, which the response data may have, changes, the integrated response data is generated by applying Equation 1 or 2, wherein respective pieces of response data are added after being multiplied by weights for discrimination between them. The integrated response data obtained through such an operation has a value of 112.

The integrated response data having the value of 112 is converted to a 2 bit value, which is the encoded integrated response data encoded by the encoder 350 as described above with reference to FIG. 3. The encoder and encoding process will be described later.

Figure 7:
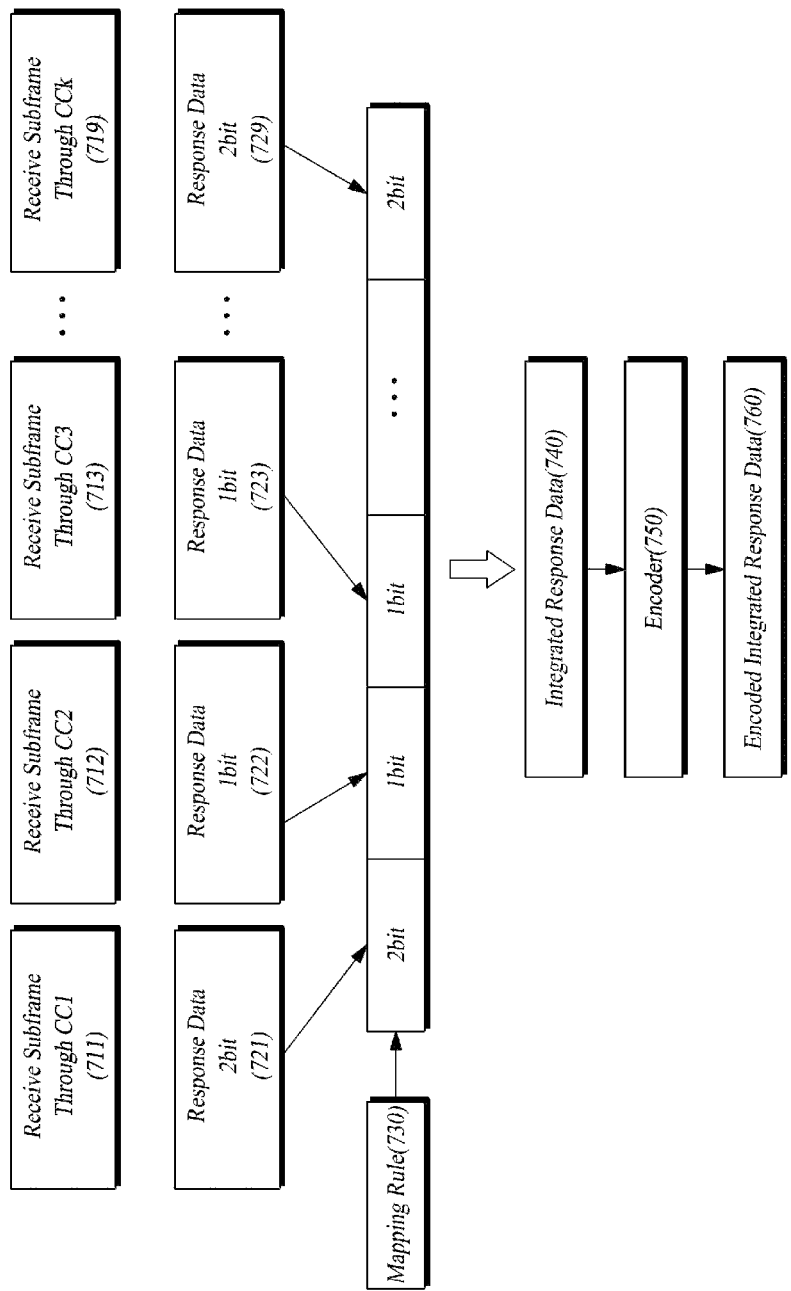
FIG. 7 shows a process of configuring integrated response data when response data of a particular CC has a 1 bit or 2 bit value, according to an embodiment of the present invention.

FIG. 7, which will be described later, shows a process of configuring integrated response data when response data of a particular CC has a 1 bit or 2 bit value, according to an embodiment of the present invention. In the mapping rule shown in FIG. 7, multiple pieces of response data are combined in serial. Such combining refers to combining of the multiple pieces of response data reflecting the weights, that is, reflecting the positions of the multiple pieces of response data.

Figure 6:
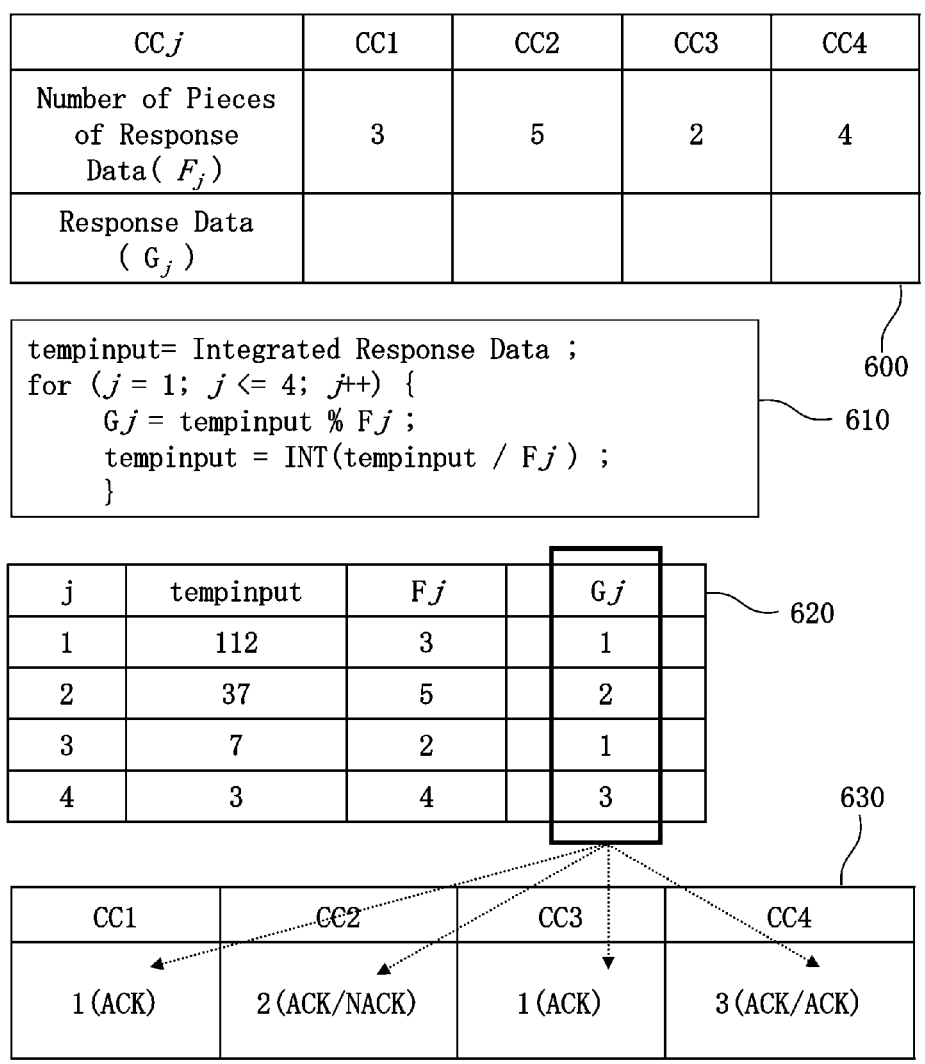
FIG. 6 illustrates a process of applying a demapping rule, by which an eNB can convert received integrated response data into response data for each component carrier, according to an embodiment of the present invention.

FIG. 6 illustrates a process of applying a demapping rule, by which an eNB can convert received integrated response data into response data for each component carrier, according to an embodiment of the present invention. The demapping rule in FIG. 6 is configured by referring to Equations 1 and 2 as described above. The eNB and the UE already share the information about whether to include the DTX and the transmission mode of a corresponding component carrier as one value in the response data. This can be naturally inferred from the fact that the eNB transmits information to the UE by using the information on the transmission mode. Therefore, the eNB stores the information 600, including Fj, of FIG. 6 in a memory within the system. For each piece of response data Gj, it is possible to extract response data for each component carrier by inversely applying Equations 1 and 2 and the process of FIG. 5. A program pseudo code for the inverse application is indicated by reference numeral 610 in FIG. 6, and information obtained by applying the program pseudo code 610 to the information 600 is indicated by reference numeral 620 in FIG. 6. As a result, it is possible to identify response information for each component carrier as indicated by reference numeral 630. In the program pseudo code 610, % (modulo) corresponds to an operator for obtaining a remainder and INT corresponds to a function for taking an integer value.

Now, the implementation of the program pseudo code 610 will be compared with Table 1. In the process shown in FIG. 5, the integrated response data having a value of 112 has been obtained. The value of 112 is input to the tempinput value, and G1, G2, G3, and G4 are then obtained. First, the tempinput is subjected to a modulo operation by F1 having a value of 3, so as to obtain 1 as G1. That is, 1 is obtained as a value of G1. Then, the tempinput is renewed by taking an integer value after dividing the original tempinput by F1. As a result, the tempinput has a value of 37.

Next, the renewed tempinput of 37 is subjected to a modulo operation by F2 having a value of 5, so as to obtain 2 as G2. Also, the tempinput is renewed again to 7 by dividing itself by 5.

Thereafter, the renewed tempinput of 7 is subjected to a modulo operation by F3 having a value of 2, so as to obtain 1 as G3. Also, the tempinput is renewed again to 3 by dividing itself by F3, i.e. 2.

Finally, the renewed tempinput of 3 is subjected to a modulo operation by F4 having a value of 4, so as to obtain 3 as G4. That is, when the program pseudo code 610 has been implemented, G1, G2, G3, and G4 have values of 1, 2, 1, and 3, respectively.

A process of generating an integrated response data by using weight information, which corresponds to an example of the mapping rule, for component carriers having response data by a UE has been described with reference to FIG. 5, and a process of extracting response data for each component carrier by a demapping rule by an eNB having received the integrated response data has been described with reference to FIG. 6. When the integrated response data is a binary number, it implies that a bit of a particular position corresponds to response data of a particular component carrier and the modulo operation described above corresponds to an operation of calculating the value of the bit of the particular position. In the case of two codewords, the particular position refers to the location of particular two bits of the integrated response data.

FIGS. 5 and 6 correspond to cases of transmitting DTX. However, embodiments of the present invention can be applied even to a case in which the DTX is not transmitted. This case allows a simpler application.

FIG. 7 illustrates a process of generating integrated response data by applying a mapping rule to each component carrier when DTX information is not transmitted, according to an embodiment of the present invention. A UE receives data through k component carriers as indicated by reference numerals 711, 712, 723, . . . , 719. One or more PDSCH can be received through subframe. So, 711, 712, 713, 719 means the PDSCHs, or data packets which can be received through k component carriers. Then, the UE generates response data for each piece of the received data. Since each of CC1 and CCk has two codewords, their response data 721 or 729 requires four pieces of information and can be configured by 2 bits. Meanwhile, CC2 and CC3 have one codeword, respectively, their response data 722 or 723 requires two pieces of information and can be configured by 1 bit. Therefore, it is possible to generate integrated response data 740 by applying the sequentially combining mapping rule 730 to the respective response data. Then, the integrated response data 740 is encoded by an encoder 750 and is then transmitted to the eNB. In FIG. 7, embodiment of the present invention, the plurality of downlink CC can share same subframe period, so, the received subframe of each CC can be identical.

In the same manner, the eNB decodes the encoded integrated response data, and can identify response data indicating whether the data transmitted through each CC has an error, by using information of the sequence in which the codewords and response data of each CC are arranged in the integrated response data.

The integrated response data as described above may serve as reference information, by which the eNB can determine whether to retransmit already transmitted data. Therefore, it is necessary to transmit and receive the integrated response data more exactly than any other information. For exact transmission and reception, an aspect of the present disclosure proposes a blocking coding, which specifically applies Reed-Muller Code to encode the integrated response data. It is also possible to use another block coding than the Reed-Muller coding. In the mapping rule in FIG. 7, the response data of each CC can be serially concatenated with the order of predetermined or cell index.

FIG. 8 is a Reed-Muller (20, A) code configuration table according to an embodiment of the present invention. In order to generate (20, A) bits, input bits having a length of A are generated as a code having a size of a maximum of 20 bits. In order to lower the possibility of error occurrence, the length A may be determined as 4~13 bits. When the length of the input bits is A ($a_0, a_1, a_2, a_3, \ldots, a_{A-1}$) and the length of the input bits is B($b_0, b_1, b_2, b_3, \ldots, b_{B-1}$) the (20, A) bits may be generated by applying Table $M_{i,n}$ of FIG. 8 and Equation 3 as defined below, wherein B may have a value of 20.

$$b_i = \sum_{n=0}^{A-1} (a_n \cdot M_{i,n}) \bmod 2, \qquad \text{[Equation 3]}$$

$$i = 0, 1, 2, \ldots, B-1$$

By using Equation 3, the integrated response data may be converted to binary numbers $a_0, a_1, a_2, a_3, \ldots, a_{A-1}$, so as to enable calculation of the encoded response data $b_0, b_1, b_2, b_3, \ldots, b_{B-1}$ through application of Equation 3 and the table shown in FIG. 8. This encoded response data is transmitted to the eNB.

FIG. 9 is a Reed-Muller (32, O) code configuration table according to an embodiment of the present invention. In order to generate (32, O) bits, input bits having a length of O are generated as a code having a size of 32 bits (or a size of 48 bits when repeated). Similarly to FIG. 8, it is possible to generate output bits by applying Equation 4 and the table of FIG. 9.

$$b_i = \sum_{n=0}^{O-1} (o_n \cdot M_{i,n}) \bmod 2 \qquad \text{[Equation 4]}$$

$$i = 0, 1, 2, \ldots, B-1$$

It is possible to encode the integrated response data by applying Equation 4 and the table $M_{i,n}$ of FIG. 9. That is, the integrated response data may be converted to binary numbers $o_0, o_1, o_2, o_3, \ldots, o_{O-1}$, so as to enable calculation of the encoded response data $b_0, b_1, b_2, b_3, \ldots, b_{B-1}$ through application of Equation 4 and the table of FIG. 9. This encoded response data is transmitted to the eNB.

By applying Equation 4, it is possible to obtain an output value having a length of 32 bits. In order to obtain larger output bits $q_0, q_1, q_2, q_3, \ldots, q_{Q_{CQI}-1}$, Equation 5 below may be applied.

$$q_i = b_{(i \bmod B)} (i=0, 1, 2, \ldots, Q_{CQI}-1) \qquad [\text{Equation 5}]$$

The integrated response data obtained through the mapping rule according to an embodiment of the present invention as shown in FIGS. 8 and 9 and Equations 3, 4, and 5 may include minimum allocatable information according to each component carrier. Therefore, the integrated response data may have a variable length, which can improve the reliability of the encoded data.

In the process of generating integrated response data by the mapping rule defined by Equation 1 as described above and generating encoded integrated response data by using Equations 3 and 4, when the length (length of binary number) of the integrated response data elastically changes according to the state of the network, the length A of the input bits in Equation 3 and the length O of the input bits in Equation 4 may change, which accordingly enables exact transmission of the encoded information. For example, it is possible to obtain the maximum length (MaxLength) of a binary number by a round-off computation after a log computation as shown in Equation 6 below, for the maximum range of a value the integrated response data may have. The maximum length (MaxLength) of the corresponding binary number is the length A of the input bits of Equation 3 and the length O of the input bits of Equation 4.

$$\text{MaxLength} = \lceil \log_2(\text{VALUE OF MAXIMUM INTEGRATED RESPONSE DATA}) \rceil \qquad [\text{Equation 6}]$$

Further, in more detail, the value of the maximum integrated response data can be obtained from the maximum value of the response data which each component carrier may have. In the example shown in Table 1, Fj functions as an input value for obtaining the maximum value. Therefore, the maximum input bit length can be obtained by Equations 7 and 8. Equation 7 corresponds to a case in which every value of Fj is a power of 2 (2, 4, 8, ... ), and Equation 8 can be applied when one of the values of Fj is not a power of 2 (3, 5, ... ).

$$\text{MaxLength} = \sum_{j=1}^{n} \log_2(F_j) \qquad [\text{Equation 7}]$$

$$\text{MaxLength} = \left\lceil \log_2\left(\prod_{l=1}^{n} F_l\right) \right\rceil \qquad [\text{Equation 8}]$$

By applying Table 1, it is possible to apply Equation 8. As a result, MaxLength has a value of 7 and the input bit length in Equations 3 and 4 may have a value of 7. This information corresponds to information which the eNB and the UE can identify based on preset information and the transmission mode of each component carrier. That is, if the input is reduced, the eNB can limit the range of calculation during the decoding process, so as to reduce the calculation quantity. Further, it is possible to obtain a performance improvement effect of the block code, which has better performance when the input bit size is smaller. When the input bit size is small and the information about the input bits is shared by the eNB and the UE, the calculation quantity for the decoding is reduced. Further, the block code may have a low probability of error occurrence in small-sized input bits.

In more detail, the (20, A) code or (32, O) code, which is a kind of Reed-Muller code, has a performance that changes according to the size of the input bits. The larger the input bit size, the lower the performance of the code. On the contrary, the smaller the input bit size, the higher the performance of the code. In the component carrier aggregation environment, the required bit quantity for transmission of the ACK/NAK information is different and may change according to the number of component carriers and the transmission scheme of each component carrier. Therefore, the bit allocation with a variable bit length according to an embodiment of the present invention can reduce the input bits of a code. During the process of decoding the input bits, the eNB can previously identify the variable length, which can improve the decoding performance.

Meanwhile, the response data as described above can provide information on whether one or more component carriers have an error, after bundling the information. The bundling refers to a scheme for obtaining a representative ACK/NAK value for multiple ACK/NAK bits through a logical AND or logical OR operation.

This process can generate integrated data by converting response data according to a mapping rule.

Figure 10:
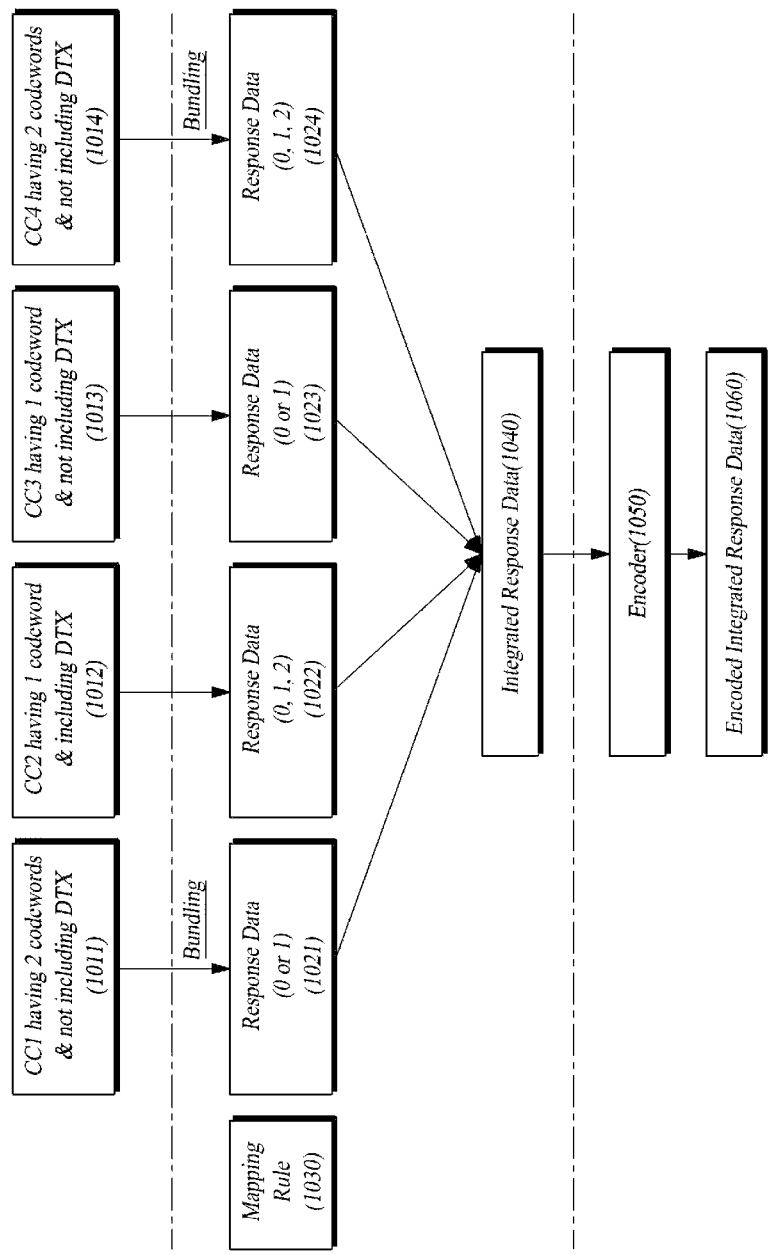
FIG. 10 is a block diagram illustrating a process of bundling for one component carrier by a mapping rule according to an embodiment of the present invention.

FIG. 10 is a block diagram illustrating a process of bundling for one component carrier by a mapping rule according to an embodiment of the present invention.

In FIG. 10, the mapping rule 1030 bundles response data of CC1 1011 and CC4 1014, respectively. CC1 1011 and CC4 1014 use two codewords and do not transmit DTX. Therefore, CC1 1011 and CC4 1014 can be bundled in such a manner that they may have only 0 and 1, other than 0, 1, 2, and 3, for the response data. Specifically, CC1 1011 and CC4 1014 may transmit 1 only when all codewords are ACK while transmitting 0 in the other cases. In this event, CC1 1011 and CC4 1014 can generate 1 bit of response data in spite of using two codewords. Further, the other component carriers, CC2 1012 and CC3 1013, may generate 2 bits of response data and 1 bit of response data, respectively. This response data is included in the integrated response data 1040 by applying Equation 1, and the encoded integrated response data 1060 encoded by the encoder 1050 is then transmitted to an eNB. Meanwhile, since the eNB has secured information on the bundled CCs through higher layer signaling, the eNB performs a decoding of the encoded integrated response data and can identify response data from the bundled information in the decoded integrated response data. For example, when 1 has been transmitted as response data of CC1, the eNB can identify ACK for both of the two codewords. Also, when 0 has been transmitted, the eNB can identify NACK for one or more of the two codewords.

Figure 11:
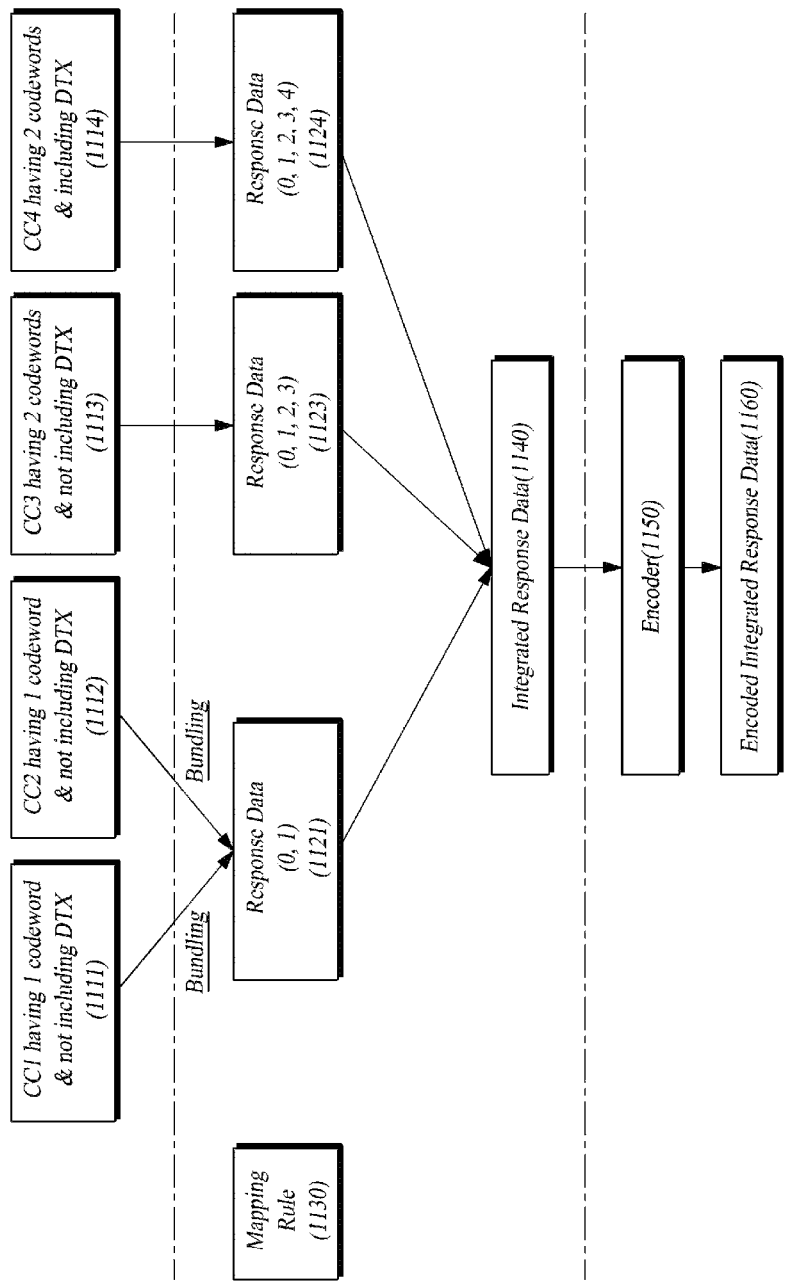
FIG. 11 is a block diagram illustrating a process of bundling for two or more component carriers by a mapping rule according to an embodiment of the present invention.

FIG. 11 is a block diagram illustrating a process of bundling for two or more component carriers by a mapping rule according to an embodiment of the present invention. CC1 1111 and CC2 1112 use one codeword and do not include DTX. Meanwhile, CC3 1113 uses two codewords and does not include DTX, and CC4 1114 uses two codewords and includes DTX. The mapping rule 1130 for generating integrated response data 1140 from these component carriers may perform a bundling to set the response data as 1 only when both CC1 1111 and CC2 1112 are ACK and as 0 in the other cases, as in the response data 1121. Since CC3 1113 and CC4 1114 may have four or five types of response data according to whether DTX is included, CC3 1113 and CC4 1114 include response data as indicated by 1123 or 1124. Further, this response data is mapped to integrated response data 1140, and the encoded integrated response data 1160 encoded by the encoder 1150 is then transmitted to an eNB.

As described above, the eNB decodes encoded integrated response data and extracts response data 1121, 1123, or 1124 from the integrated response data. In the response data 1121, ACK or NACK information of two component carriers 1111 and 1121 has been bundled. Therefore, when the response data is 1, it is possible to identify that data transmission has succeeded in the two component carriers 1111 and 1112. When the response data is 0, it is possible to identify that an error has occurred in at least one of the two component carriers 1111 and 1112.

The bundling may be performed in various ways as well as the processes shown in FIGS. 10 and 11. Bundling applicable according to the present invention may include bundling applied within the component carriers as described above, bundling applied between component carriers, and bundling of response data during a predetermined interval (subframe). In the bundling related to the subframe, ACK/NACK for all data received through the subframe may be used as response data.

Figure 12:
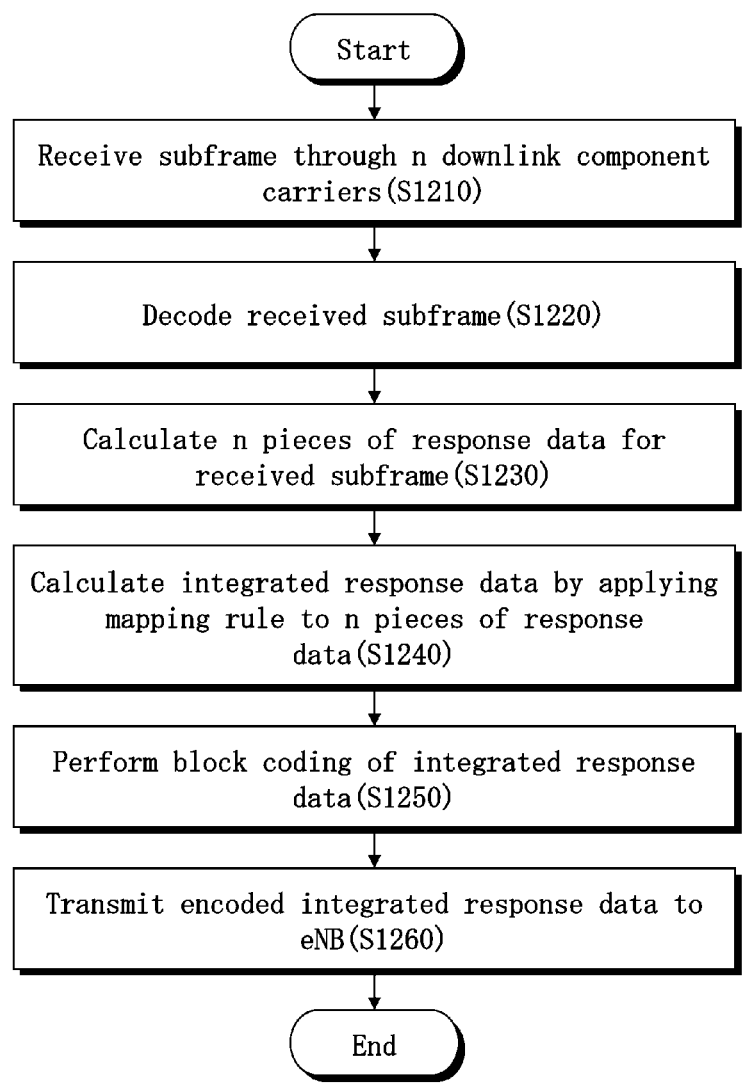
FIG. 12 is a flowchart illustrating a process of generating and transmitting integrated response data by a UE according to an embodiment of the present invention.

FIG. 12 is a flowchart illustrating a process of generating and transmitting integrated response data by a UE according to an embodiment of the present invention.

The UE receives PDSCH (Physical Downlink Shared Channel)s in subframe from an eNB through n downlink component carriers (step S1210). Further, the UE decodes the received PDSCHs of subframe (step S1220), and calculates n pieces of response data (step S1230). As described above with reference to FIG. 10, the UE may perform bundling during the process of calculating the response data for one component carrier. That is, for data received through a first downlink component carrier using two or more codewords from among the n downlink component carriers, the UE may determine whether to transmit/receive each codeword, and then yield one piece of response data indicating a result of the determination for each codeword. In this event, the response data may have 1 bit or 2 bits. Further, when two codewords are included, it is possible to generate a total of 2 bits of response data (including 1 bit for each codeword).

The received PDSCHs subframe is a transmission unit for transmitting a physical signal including control information and data information and can be also expressed by another name, such as frame or block. There may be various embodiments of the process of decoding the PDSCHs of the subframe. First, when a Semi Persistent Scheduling (SPS) is operated, the PDCCH is transmitted only in an activation period and is not transmitted before a release occurs after the activation period. Therefore, the PDCCH may not be included. Meanwhile, even when the SPS is operated, the UE may keep on decoding the PDCCH, and may decode the PDSCH by using the previously received PDCCH before a release signaling by the PDCCH occurs.

The received PDSCHs in subframe may be a control information channel providing information necessary for including data in a PDSCH and transmitting the PDSCH by using the component carrier, and may be specifically a PDCCH. Since the contents of the PDCCH can be identified by decoding the PDCCH, the process may further include a step of decoding a control information channel, such as PDCCH. Meanwhile, in the case of the PDCCH, the response data may include control information, such as ACK, NACK, DTX, and SR, wherein DTX implies information reporting that the PDCCH has not been transmitted. The ACK, NACK, DTX information can be assigned to each component carrier. But SR 1 bit can be concatenated with the integrated response data. A particular component carrier may not include PDCCH. When a UE fails to find a PDCCH during the process in which the UE decodes data received through component carrier, the UE may generate DTX as response data, instead of ACK or NACK. Meanwhile, the SR implies that information requesting the execution of scheduling has been additionally included in the response data. As described above with reference to Table 1, it is possible to generate 2 bits of response data when one codeword is used and both DTX and SR are required to be included. Also, even when two codewords are used and both DTX and SR are required to be included, it is possible to generate 3 bits of response data.

As examples of the decoding process, i) it is possible to determine whether a PDCCH is included, by decoding a received PDSCH of subframe, ii) it is possible to transmit DTX when a PDCCH is not included, and iii) when a PDCCH is included, it is possible to determine ACK/NACK from a PDSCH.

Further, by applying the mapping rule to the n pieces of response data, integrated response data is produced (step S1240). According to the mapping rule, as described above with reference to Equation 1 and FIGS. 5 and 6, it is possible to generate integrated response data by applying weights set based on the downlink component carriers to the response data. The weights may be determined by one or more combinations of a priority of a downlink component carrier in the carrier aggregation environment, a transmission mode of a downlink component carrier, and information on whether to include DTX as response data. In more detail, the mapping rule generates k bits of information by sequentially combining the n pieces of response data according to the sequence set for the downlink component carriers, wherein k has a size from a minimum of n to a maximum of 2*n. For example, when there are n pieces of response data each having a size of 1 bit or 2 bits, a combination of these n pieces of response data yields a binary number. In this event, the sequential combining does not strictly imply that the combining process is performed sequentially, but refers to that there is a sequence between the pieces of response data.

Further, the mapping rule may bundle the response data of component carriers in the way as shown in FIG. 11. Specifically, it is possible to generate one piece of response data representing two or more pieces of response data for two or more downlink component carriers, from among the n pieces of response data.

Then, the UE performs a block coding of the integrated response data, so as to produce encoded integrated response data (step S1250). The block coding may convert the integrated response data to a binary number to be input bits of Reed-Muller (20, A) or (32, O). In this event, the integrated response data has a variable length, which achieves a more reliable encoding. When the encoding has been completed through the block coding, the UE transmits the encoded integrated response data to the eNB (step S1260).

Figure 13:
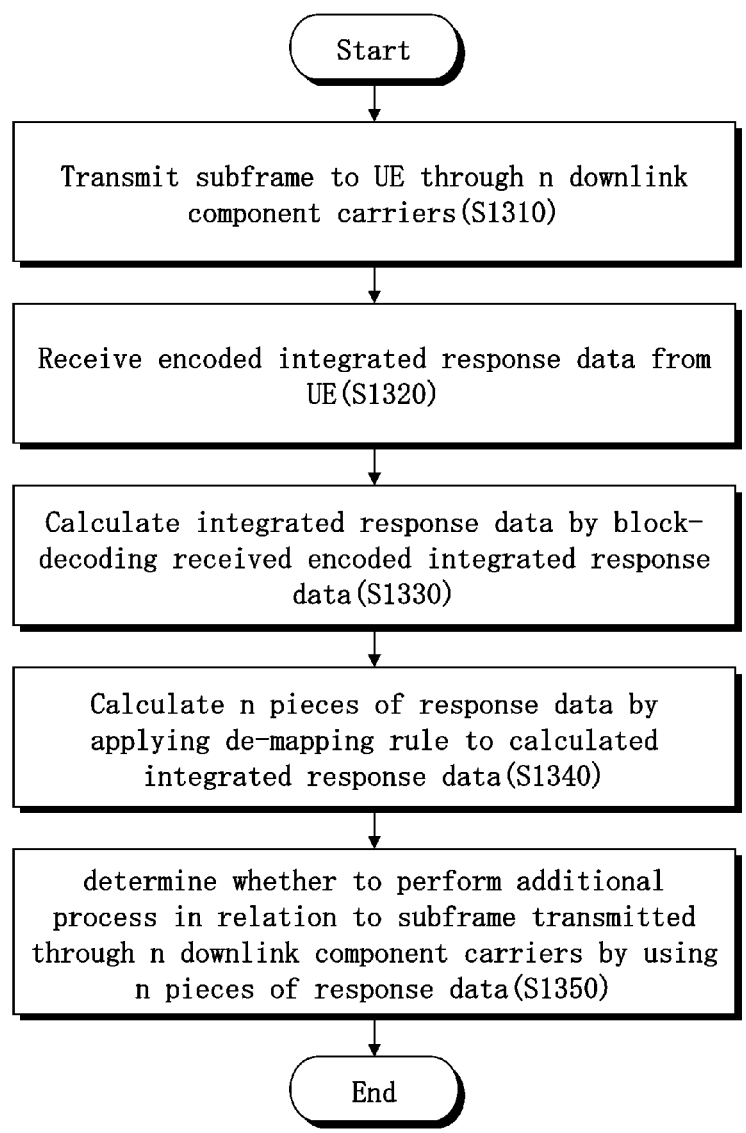
FIG. 13 is a flowchart illustrating a process of receiving integrated response data and identifying response data according to each component carrier by an eNB according to an embodiment of the present invention.

FIG. 13 is a flowchart illustrating a process of receiving integrated response data and identifying response data according to each component carrier by an eNB according to an embodiment of the present invention.

First, the eNB transmits n PDSCHs in subframe to a UE through n downlink component carriers. The transmitted PDSCH is information wirelessly transmitted or received and may be called by various different names, such as packet, frame, and wireless symbol. According to the characteristics of the subframe, when the SPS is operated, the PDCCH is transmitted only in an activation period and is not transmitted before a release occurs after the activation period. Therefore, the PDCCH may not be included. Meanwhile, even when the SPS is operated, the UE may keep on decoding the PDCCH, and may decode the PDSCH by using the previously received PDCCH before a release signaling by the PDCCH occurs.

The eNB receives the encoded integrated response data from the UE (step S1320). Further, the eNB block-decodes the received encoded integrated response data, so as to produce integrated response data (step S1330). At this time, in order to decode the integrated response data, the eNB may extract information on the length of the integrated response data and apply the extracted information to the block decoding. That is, as described above, it is possible to obtain the values of Fj of Table 1 by using the transmission mode of component carriers, information on whether the DTX is included, etc., and is possible to identify the length of the integrated response data (binary number) by applying the extracted information to Equations 7 and 8. Use of the identified length as the length of a code to be decoded in the block decoding can improve the decoding efficiency. As described above, the (20, A) code or (32, O) code, which is a kind of Reed-Muller code, has a performance that changes according to the size of the input bits. The larger the input bit size, the lower the performance of the code. On the contrary, the smaller the input bit size, the higher the performance of the code. In the component carrier aggregation environment, the required bit quantity for transmission of the ACK/NAK information is different and may change according to the number of component carriers and the transmission scheme of each component carrier. Therefore, the bit allocation with a variable bit length according to an embodiment of the present invention can reduce the input bits of a code. During the process of decoding the input bits, the eNB can previously identify the variable length, which can improve the decoding performance. Therefore, by calculating values of Fj, which can be identified from each component carrier during the decoding process, and then calculating the length of the integrated response data based on the values of Fj, it is possible to improve the decoding performance.

Then, the eNB calculates n pieces of response data by applying the de-mapping rule to the response data obtained through the decoding (step S1340). According to the de-mapping rule, it is possible to obtain response data for each downlink component carrier by using the weights given based on the downlink component carriers. In more detail, the weights may be determined by one or more combinations of a priority of a downlink component carrier in the carrier aggregation environment, a transmission mode of a downlink component carrier, and information on whether to include DTX as response data. When the integrated response data has a length of k bits, it is possible to obtain n pieces of response data each having a size of 1 bit or 2 bits for each downlink component carrier by applying the de-mapping rule reflecting the weights given to the n pieces of downlink response data to the calculated integrated response data.

Further, it is also possible to calculate bundled data. As described above with reference to FIG. 11, representative values of response data of two or more component carriers are first calculated from the integrated response data and are then obtained as the response data of the two or more component carriers, respectively.

After n pieces of response data for the component carriers are obtained, the eNB determines whether to perform an additional process in relation to the subframe having been transmitted through the n downlink component carriers by using the n pieces of response data (step S1350). In this event, as shown in FIG. 10, the eNB may determine whether the response data is bundled response data for each codeword within the component carrier. That is, the eNB may determine whether to retransmit a corresponding downlink component carrier by using a representative value indicated by the response data for a first downlink component carrier using two or more codewords among the n downlink component carriers. Further, in order to determine whether to perform an additional process, the eNB may determine when it is necessary to perform an additional process when response data, such as DTX and SR, is transmitted. As described above, when the transmitted n PDSCHs in subframe includes a control information channel, especially a PDCCH, the response data may include ACK/NACK, DTX, and SR. The DTX refers to a result of determination by the UE that the PDCCH has not been transmitted. Some particular component carriers may not include a PDCCH, and the UE may report that such a component carrier does not include a PDCCH because the UE has not received the PDCCH. In this event, the eNB may receive response data including the DTX. Meanwhile, the response data may additionally include information requesting for proceeding of scheduling.

According to the present disclosure, based on an assumption that the number of all component carriers taken into consideration in a system under carrier aggregation environment is N and the number of component carriers allocated to a particular UE is n, n has a value smaller than or equal to N and may be changed by scheduling by the eNB. This change is reported to the UE by higher layer signaling and may have different CC configuration according to the UE. When the number of component carriers allocated to the UE is n, the component carriers may be expressed by CC1, CC2, . . . , and CCn, respectively, which implies that the component carriers absolutely discriminated in the system may be specifically differ in each UEs.

If the eNB can configure a PDCCH indicating downlink (DL) grant from the component carriers CC1, CC2, . . . , and CCn, PDSCH is allocated in the unit of downlink subframe by the PDCCH. In this event, the PDCCH does not always exist for the component carriers CC1, CC2, . . . , and CCn, and may instantly exist in only a part of them.

Figure 14:
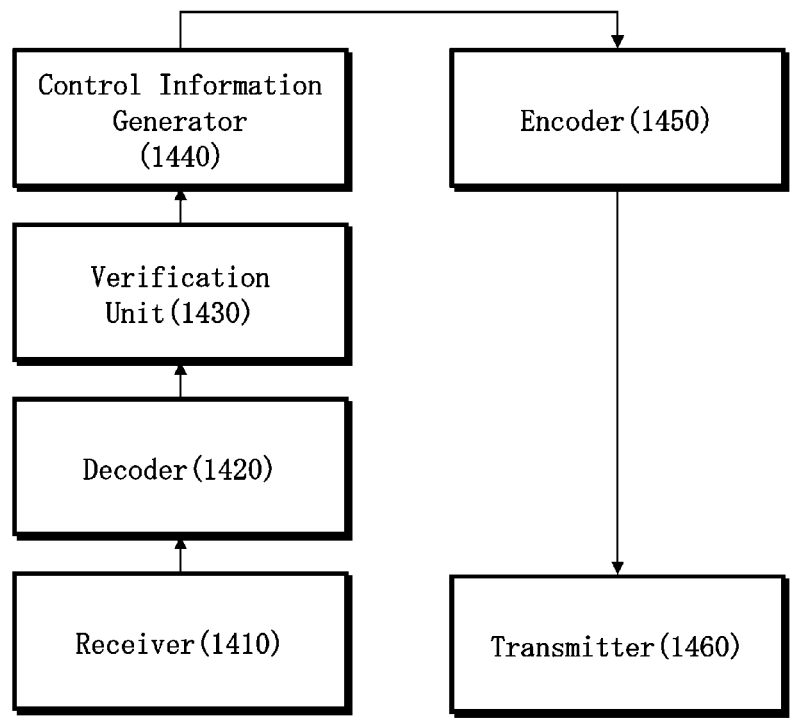
FIG. 14 is a block diagram illustrating a configuration of a UE generating and transmitting integrated response data according to an embodiment of the present invention.

FIG. 14 is a block diagram illustrating a configuration of a UE generating and transmitting integrated response data according to an embodiment of the present invention.

The UE includes a receiver 1410, a decoder 1420, a verification unit 1430, a control information generator 1440, an encoder 1450, and a transmitter 1460. In more detail, FIG. 14 shows a configuration of a UE transmitting uplink control information in a carrier aggregation environment, wherein the UE includes a receiver 1410 for receiving n PDSCHs in subframe through n downlink component carriers from an eNB, a decoder 1420 for decoding the received PDSCH, a verification unit 1430 for producing n pieces of response data by checking whether an error is found in the decoded PDSCH, a control information generator 1440 for producing integrated response data by applying a mapping rule to the n pieces of response data, an encoder 1450 for block-coding the integrated response data, and a transmitter 1460 for transmitting the encoded integrated response data to the eNB. Further, the control information generator 1440 includes a mapping rule. Especially, the mapping rule as defined by Equation 1 as described above can apply weights set based on the downlink component carriers to the response data. The weights may be determined by one or more combinations of a priority of a downlink component carrier in the carrier aggregation environment, a transmission mode of a downlink component carrier, and information on whether to include DTX as response data. In more detail, the mapping rule generates k bits of information by sequentially combining the n pieces of response data according to the sequence set for the downlink component carriers, wherein k has a size from a minimum of n to a maximum of 2*n. For example, when there are n pieces of response data each having a size of 1 bit or 2 bits, a combination of these n pieces of response data yields a binary number. In this event, the sequential combining does not strictly imply that the combining process is performed sequentially, but refers to that there is a sequence between the pieces of response data.

There may be various embodiments of the process of decoding the PDSCH. First, when an SPS is operated, the PDCCH is transmitted only in an activation period and is not transmitted before a release occurs after the activation period. Therefore, the PDCCH may not be included. Meanwhile, even when the SPS is operated, the UE may keep on decoding the PDCCH, and may decode the PDSCH by using the previously received PDCCH before a release signaling by the PDCCH occurs.

The decoded PDSCH may be a control information channel providing information necessary for including data in a PDSCH and transmitting the PDSCH by using the component carrier, and may be specifically a PDCCH. Since the contents of the PDCCH can be identified by decoding the PDCCH, the process may further include a step of decoding a control information channel, such as PDCCH. Meanwhile, in the case of the PDCCH, the response data may include control information, such as ACK, NACK, DTX, and SR, wherein DTX implies information reporting that the PDCCH has not been transmitted. A particular component carrier may not include PDCCH. When a UE fails to find a PDCCH during the process in which the UE decodes data received through component carrier, the verification unit 1430 may generate DTX as response data, instead of ACK or NACK. Meanwhile, the SR implies that information requesting the execution of scheduling has been additionally included in the response data. As described above with reference to Table 1, it is possible to generate 2 bits of response data when one codeword is used and both DTX and SR are required to be included. Also, even when two codewords are used and both DTX and SR are required to be included, it is possible to generate 3 bits of response data.

The decoder 1420 can: i) determine whether a PDCCH is included, by decoding a received PDSCH; ii) transmit DTX when a PDCCH is not included; and iii) decode a PDSCH when a PDCCH is included. Thereafter, the verification unit 1430 can determine ACK/NACK from a PDSCH.

Further, the verification unit 1430 can perform the bundling as described above with reference to FIG. 10. Specifically, for data received through a first downlink component carrier using two or more codewords from among the n downlink component carriers, the verification unit 1430 may determine whether to transmit/receive each codeword, and then yield one piece of response data indicating a result of the determination for each codeword. In this event, the response data may have 1 bit or 2 bits. Further, when two codewords are included, it is possible to generate a total of 2 bits of response data (including 1 bit for each codeword).

Also, the control information generator 1440 can perform the bundling of response data between component carriers as described above with reference to FIG. 11. Specifically, the control information generator 1440 produces one piece of response data representing two or more pieces of response data for two or more downlink component carriers among the n pieces of response data.

The block coding may convert the integrated response data to a binary number to be input bits of Reed-Muller (20, A) or (32, O). In this event, the integrated response data has a variable length, which achieves a more reliable encoding. When the encoding has been completed through the block coding, the transmitter 1460 transmits the encoded integrated response data to the eNB.

Figure 15:
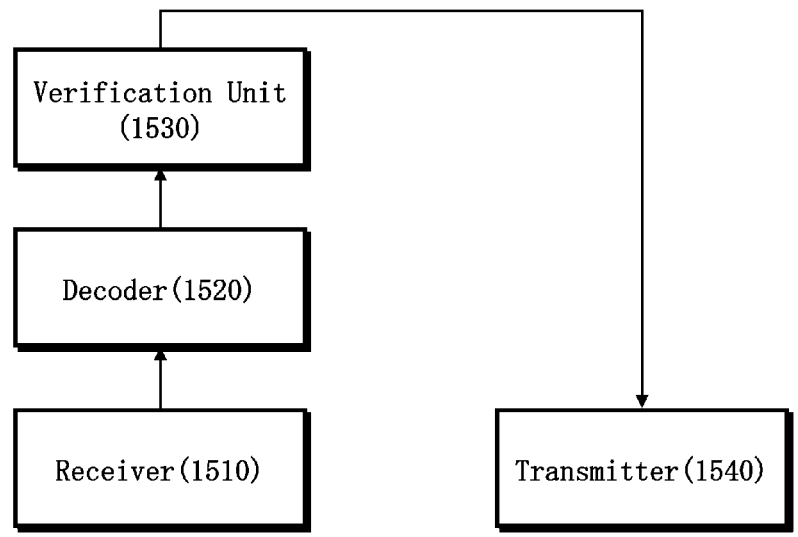
FIG. 15 is a block diagram illustrating a configuration of an eNB receiving integrated response data according to an embodiment of the present invention and identifying response data of each component carrier.

FIG. 15 is a block diagram illustrating a configuration of an eNB receiving integrated response data according to an embodiment of the present invention and identifying response data of each component carrier.

First, the eNB transmits n PDSCHs in subframe to a UE through n downlink component carriers. This transmission is performed by a transmitter 1540. The transmitted PDSCHs in subframe is a transmission unit for transmitting a physical signal including control information and data information and can also be expressed by another name, such as frame or block. As characteristics of the subframe, first, the PDCCH is transmitted only in an activation period and is not transmitted before a release occurs after the activation period. Therefore, the PDCCH may not be included. Meanwhile, even when the SPS is operated, the UE may keep on decoding the PDCCH, and may decode the PDSCH by using the previously received PDCCH before a release signaling by the PDCCH occurs.

The eNB, which is an apparatus for receiving uplink control information in a carrier aggregation environment, has a construction including a receiver 1510, a decoder 1520, a verification unit 1530, and a transmitter 1540. Specifically, the eNB includes a transmitter 1540 for transmitting PDSCHs in subframe to a UE through n downlink component carriers, a receiver 1510 for receiving encoded integrated response data for the transmitted PDSCHs in subframe, a decoder 1520 for producing integrated response data by block-decoding the received encoded integrated response data, and a verification unit 1530 for producing n pieces of response data by applying a de-mapping rule to the block-decoded integrated response data and determining whether to perform an additional process for the PDSCHs in subframe transmitted through the n downlink component carriers by using the n pieces of response data.

According to the de-mapping rule of the verification unit 1530, it is possible to obtain response data for each downlink component carrier by using the weights given based on the downlink component carriers. For example, the weights may be determined by one or more combinations of a priority of a downlink component carrier in the carrier aggregation environment, a transmission mode of a downlink component carrier, and information on whether to include DTX as response data. When the integrated response data has a length of k bits, it is possible to obtain n pieces of response data each having a size of 1 bit or 2 bits for each downlink component carrier by applying the de-mapping rule reflecting the weights given to the n pieces of downlink response data to the calculated integrated response data.

Further, the verification unit 1530 may determine the bundled response data by a representative value as described above with reference to FIGS. 10 and 11. That is, as shown in FIG. 10, the verification unit 1530 may determine whether to retransmit a corresponding downlink component carrier by using a representative value indicated by the response data for a first downlink component carrier using two or more codewords among the n downlink component carriers.

Further, as shown in FIG. 11, the verification unit 1530 may first calculate representative values of response data of two or more component carriers from the integrated response data and then obtain the calculated representative values as the response data of the two or more component carriers, respectively.

The verification unit 1530 may extract information on the original length of the integrated response data and apply the extracted information to the block decoding, in order to decode the integrated response data. That is, as described above, it is possible to obtain the values of Fj of Table 1 by using the transmission mode of component carriers, information on whether the DTX is included, etc., and it is possible to identify the length of the integrated response data (binary number) by applying the extracted information to Equations 7 and 8. Use of the identified length as the length of a code to be decoded in the block decoding can improve the decoding efficiency. As described above, the (20, A) code or (32, O) code, which is a kind of Reed-Muller code, has a performance that changes according to the size of the input bits. The larger the input bit size, the lower the performance of the code. On the contrary, the smaller the input bit size, the higher the performance of the code. In the component carrier aggregation environment, the required bit quantity for transmission of the ACK/NAK information is different and may change according to the number of component carriers and the transmission scheme of each component carrier. Therefore, the bit allocation with a variable bit length according to an embodiment of the present invention can reduce the input bits of a code. During the process of decoding the input bits, the eNB can previously identify the variable length, which can improve the decoding performance. Therefore, by calculating values of Fj, which can be identified from each component carrier during the decoding process, and then calculating the length of the integrated response data based on the values of Fj, it is possible to improve the decoding performance. The additional process determined by the verification unit 1530 may become a step following the above process when the response data is NACK. When response data, such as DTX and SR, is transmitted, the verification unit 1530 may determine whether it is necessary to perform an additional process.

As described above, when the transmitted PDSCHs in subframe includes a control information channel, especially a PDCCH, the response data may include ACK/NACK, DTX, and SR. The DTX refers to a result of determination by the UE that the PDCCH has not been transmitted. Some particular component carriers may not include a PDCCH, and the UE may report that such a component carrier does not include a PDCCH because the UE has not received the PDCCH. In this event, the eNB may receive response data including the DTX. Meanwhile, the response data may additionally include information requesting for proceeding of scheduling.

Figure 16:
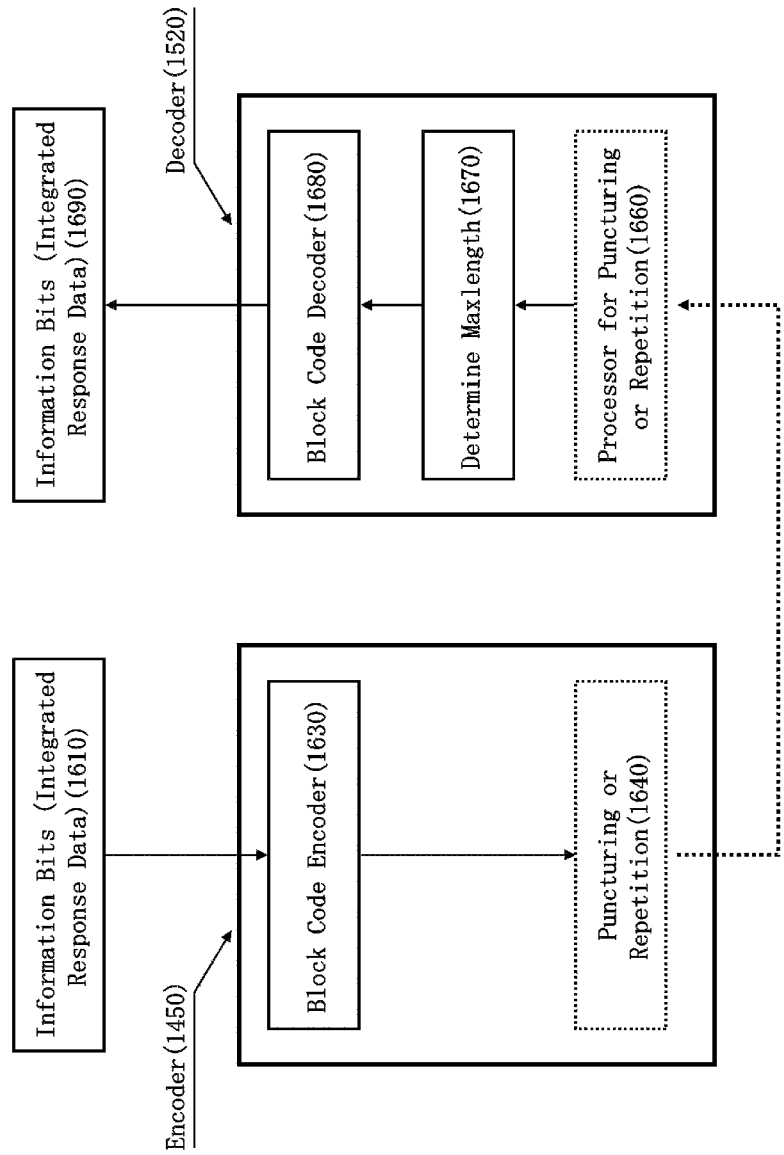
FIG. 16 is a block diagram illustrating configurations of an encoder and a decoder according to embodiments of the present invention.

FIG. 16 is a block diagram illustrating configurations of an encoder and a decoder according to embodiments of the present invention.

In the encoder 1450 of FIG. 14 and the decoder 1520 of FIG. 15 according to embodiments of the present invention, the portions relating to the puncturing or repetition may exist or may not exist according to the application of the block code. In general, the block code refers to a Reed-Muller Code, such as (20, A) or (32, O) code. However, the present invention is not limited to this configuration and may employ various block codes. Reference numeral 1610 indicates information bits, which correspond to integrated response data input to the encoder. As described above, the encoder 1610 may encode integrated response data by determining the maximum length (MaxLength) of the integrated response data and using the determined maximum length as the length of input bits to the block code encoder 1630. Likewise, the decoder 1520 may determine the maximum length (MaxLength) of the integrated response data by using information on the characteristics of component carriers (as indicated by reference numeral 1670), and decode the integrated response data by using the determined maximum length as the length of data to be decoded by the block code decoder 1680.

According to embodiments of the present invention, when ACK/NACK information transmitted in the uplink under a CA situation is encoded in the form of a predetermined block code (e.g. Reed-Muller Code), the length of the information to be transmitted changes according to the number of CCs, the MIMO scheme, and according to whether to perform a DTX check.

While the exemplary embodiments have been shown and described, it will be understood by those skilled in the art that various changes in form and details may be made thereto without departing from the spirit and scope of this disclosure as defined by the appended claims and their equivalents. Thus, as long as modifications fall within the scope of the appended claims and their equivalents, they should not be misconstrued as a departure from the scope of the invention itself.

The invention claimed is:

1. A method of transmitting uplink control information in a carrier aggregation environment, the method comprising:
   determining n pieces of Hybrid Automatic Repeat request (HARQ) response data, each piece having 1 bit or 2 bits, the 1 bit corresponding to a single codeword transmission, the 2 bits corresponding to a two-codeword transmission, and the n pieces of HARQ response data being responsive to data channel receptions through n downlink component carriers comprising a first downlink component carrier and a second downlink component carrier;
   determining k bits of integrated response data by combining the n pieces of response data in serial according to a sequence preset for downlink component carriers, the k bits of integrated response data comprising 2 bits corresponding to the first downlink component carrier and 1 bit corresponding to the second downlink component carrier; and
   performing a coding of the integrated response data to produce encoded integrated response data, and transmitting the encoded integrated response data to an Evolved Node B (eNB),
   wherein two codewords of the first downlink component carrier correspond to 2 bits of a first piece of the HARQ response data, and
   wherein a single codeword of the second downlink component carrier corresponds to 1 bit of a second piece of the HARQ response data.

2. The method of claim 1, wherein the response data comprises one or more combinations of ACK/NACK information corresponding to each component carrier and Scheduling Request (SR) information.

3. An apparatus to transmit uplink control information in a carrier aggregation environment, the apparatus comprising:
   a receiver to receive n data channels from an Evolved Node B (eNB) through n downlink component carriers comprising a first downlink component carrier and a second downlink component carrier;
   a decoder to decode the received n data channels;

a processor to determine n pieces of Hybrid Automatic Repeat request (HARQ) response data, each piece having 1 bit or 2 bits, the 1 bit corresponding to a single codeword transmission, the 2 bits corresponding to a two-codeword transmission, and the n pieces of HARQ response data being responsive to the received n data channels;

a control information generator to determine k bits of integrated response data by combining the n pieces of response data in serial according to a sequence preset for downlink component carriers, the k bits of integrated response data comprising 2 bits corresponding to the first downlink component carrier and 1 bit corresponding to the second downlink component carrier;

an encoder to perform a coding of the integrated response data; and a transmitter to transmit the encoded integrated response data to the eNB, wherein two codewords of the first downlink component carrier correspond to 2 bits of a first piece of the HARQ response data, and wherein a single codeword of the second downlink component carrier corresponds to 1 bit of a second piece of the HARQ response data.

4. The apparatus of claim 3 wherein the response data comprises one or more combinations of ACK/NACK information corresponding to each component carrier and Scheduling Request (SR) information.

* * * * *